United States Patent
Ross (10) Patent No.: US 10,778,334 B2
(45) Date of Patent: Sep. 15, 2020

(54) FIBER/WIRELESS HYBRID SOLUTION

(71) Applicant: Vivint, Inc., Provo, UT (US)

(72) Inventor: Kevin Ross, Saratoga Springs, UT (US)

(73) Assignee: Vivint, Inc., Provo, UT (US)

( * ) Notice: Subject to any disclaimer, the term of this patent is extended or adjusted under 35 U.S.C. 154(b) by 64 days.

(21) Appl. No.: 14/298,257

(22) Filed: Jun. 6, 2014

(65) Prior Publication Data

US 2015/0358082 A1 Dec. 10, 2015

(51) Int. Cl.

| | |
|---|---|
| *H04B 10/2575* | (2013.01) |
| *H04B 10/11* | (2013.01) |
| *H04W 76/15* | (2018.01) |
| *H04B 10/27* | (2013.01) |
| *H04W 76/12* | (2018.01) |
| *H04W 88/08* | (2009.01) |

(52) U.S. Cl.
CPC ....... *H04B 10/25753* (2013.01); *H04B 10/27* (2013.01); *H04W 76/12* (2018.02); *H04B 10/11* (2013.01); *H04W 76/15* (2018.02); *H04W 88/085* (2013.01)

(58) Field of Classification Search
None
See application file for complete search history.

(56) References Cited

U.S. PATENT DOCUMENTS

| | | | | |
|---|---|---|---|---|
| 4,809,361 A | * | 2/1989 | Okada ............... | H04L 12/40019 398/139 |
| 4,916,460 A | * | 4/1990 | Powell ................. | H01Q 3/2676 343/853 |
| 4,928,317 A | * | 5/1990 | Franchini ............... | H04B 10/11 398/119 |
| 5,371,734 A | * | 12/1994 | Fischer ............. | H04W 52/0274 370/311 |
| 5,890,055 A | * | 3/1999 | Chu ..................... | H04B 7/2606 455/16 |
| 6,239,888 B1 | * | 5/2001 | Willebrand ........ | H04B 10/1125 398/118 |
| 6,323,980 B1 | * | 11/2001 | Bloom ............... | H04B 10/1125 398/116 |
| 6,721,510 B2 | * | 4/2004 | Graves ............... | H04B 10/1125 398/122 |
| 6,731,878 B1 | * | 5/2004 | Britz .................. | H04B 10/1121 398/118 |

(Continued)

OTHER PUBLICATIONS

Brewer, Picture Yourself Networking: Your Home or Small Office, 2009, Cource Technology, p. 141.*

(Continued)

*Primary Examiner* — Jai M Lee
(74) *Attorney, Agent, or Firm* — Holland & Hart, LLP (57) ABSTRACT

Methods and systems are described for a hybrid fiber/wireless network. The network includes a first cluster of individual data plan subscribers interconnected with a first fiber communication network, a second cluster of individual data plan subscribers interconnected with a second fiber communication network, a backhaul wireless communication device coupled to the first fiber communication network, a backhaul network point in wireless communication with the backhaul wireless communication device, and a point-to-point wireless communication link formed between the first and second fiber communication networks.

19 Claims, 8 Drawing Sheets

(56) References Cited

U.S. PATENT DOCUMENTS

| | | | | |
|---|---|---|---|---|
| 6,735,452 | B1* | 5/2004 | Foster, Jr. | H04W 88/14 455/562.1 |
| 6,763,195 | B1* | 7/2004 | Willebrand | H04B 10/1123 398/115 |
| 6,816,458 | B1* | 11/2004 | Kroon | H04L 47/10 370/235 |
| 6,842,439 | B2* | 1/2005 | Zeitfuss | H04B 10/1125 370/328 |
| 7,295,777 | B1* | 11/2007 | Britz | H04B 10/1125 379/56.2 |
| 7,409,159 | B2* | 8/2008 | Izadpanah | H04B 10/1149 379/56.1 |
| 7,660,559 | B2* | 2/2010 | Herscovich | H04B 7/061 455/129 |
| 8,374,508 | B2* | 2/2013 | Soto | H04B 10/272 398/115 |
| 8,463,130 | B2* | 6/2013 | Ma | H04B 10/1149 398/115 |
| 8,493,889 | B2 | 7/2013 | Wittenschlaeger | |
| 8,502,733 | B1* | 8/2013 | Negus | H04W 4/00 342/359 |
| 8,520,578 | B2 | 8/2013 | Rayment et al. | |
| 2002/0094842 | A1* | 7/2002 | Aburakawa | H04B 10/25753 455/561 |
| 2002/0131123 | A1* | 9/2002 | Clark | H04Q 11/0062 398/118 |
| 2002/0131130 | A1* | 9/2002 | Clark | H04B 10/1125 398/121 |
| 2003/0078052 | A1* | 4/2003 | Atias | H04B 10/25759 455/453 |
| 2004/0063433 | A1* | 4/2004 | Garrison | H04W 16/00 455/447 |
| 2005/0069324 | A1* | 3/2005 | Tegge, Jr. | H04B 10/1125 398/118 |
| 2006/0209766 | A1* | 9/2006 | Britz | H04K 1/003 370/335 |
| 2009/0029645 | A1* | 1/2009 | Leroudier | H04W 84/047 455/7 |
| 2009/0116393 | A1* | 5/2009 | Hughes | H04L 45/124 370/238 |
| 2011/0026933 | A1* | 2/2011 | von der Weid | G02B 6/32 398/139 |
| 2014/0044041 | A1* | 2/2014 | Moshfeghi | H04W 24/02 370/328 |
| 2014/0105048 | A1* | 4/2014 | Tellado | H04W 24/10 370/252 |
| 2014/0233960 | A1* | 8/2014 | Peach | H04B 10/1129 398/119 |
| 2014/0376920 | A1* | 12/2014 | Laraqui | H04W 24/02 398/115 |
| 2015/0036562 | A1* | 2/2015 | Sturkovich | H03L 7/06 370/281 |
| 2015/0050026 | A1* | 2/2015 | Samsuri | H04B 10/25754 398/116 |
| 2016/0037511 | A1* | 2/2016 | Vincze | H04B 7/024 370/329 |

OTHER PUBLICATIONS

Vacca, John R., Optical Networking Best Practices Handbook, 2007, p. 101.*
Antoniades et al., WDM Systems and Networks, 2012, pp. 277-278.*
Cowley, John, Communications and Networking: An Introduction, 2012, Springer-Verlag London, 2nd Ed., pp. 32-33.*
McCutchan, Steve, How Wide Should a Neighborhood Street Be?, Sep. 25, 2013, PlannersWeb.*
Kartalopoulos, Stamatios V., Free Space Optical Networks for Ultra-Broad Band Services, 2011, John Wiley & Sons, pp. 91-93.*
Aruba Networks, Outdoor Point-to-Point Deployment, 2011, obtained from http://www.bridgewavedirect.com/adaptpath/, pp. 1-60.
System Support Solutions, BridgeWave AdaptPath, obtained from http://www.bridgewavedirect.com/adaptpath/, on Apr. 11, 2014, 8 pages.
Cisco, Cisco Aironet 1400 Series Wireless Bridge, obtained from http://www.bridgewavedirect.com/adaptpath/, on Apr. 11, 2014, 10 pages.

* cited by examiner

FIBER/WIRELESS HYBRID SOLUTION

BACKGROUND

Fiber networks are known to provide high capacity, high speed data transmission. Several major companies such as Google and Verizon are investing in fiber networks in limited geographic areas and communities to provide improved data transmission services for their customers. One of the drawbacks to fiber networks is the significant installation costs and time required to install, especially in pre-existing neighborhoods and business areas. One of the most significant time and cost requirements when installing fiber networks relates to traversing roads. Typically, horizontal drilling is required to pass the fiber under the road. Passing the fiber above roads (e.g., using suspended lines) is another option, but is much less desirable. Opportunities exist for improving the cost and time requirements for fiber installation.

SUMMARY

Methods and systems are described for transmitting data using fiber and wireless communications systems. In one embodiment, a method for transmitting data using fiber and wireless communication systems includes forming a wireless communication link between a first local wireless device and a remote backhaul network point, forming a first fiber communication link between the first local wireless device and a first cluster of local computing devices, forming a second fiber communication link between a second cluster of local computing devices, forming at least one point-to-point wireless communication link between the first cluster of local computing devices and the second cluster of local computing devices, and transferring data between the remote backhaul network point and the first and second clusters of local computing devices using the first and second wireless communication links and the first and second fiber communication links.

In one example, the first and second clusters of local computing devices may be separated by a paved road. Each of the local computing devices may be located at a separate house. The method may include providing a second local wireless device associated with the second cluster of local computing devices, and forming the at least one point-to-point wireless communication link may include wireless communication between the first and second local wireless devices. The remote backhaul network point may include a base station. The method may include forming a third fiber communication link between a third cluster of local computing devices, and forming at least one point-to-point wireless communication link between one of the first and second clusters of local computing devices and the third cluster of local computing devices, wherein the third cluster of local computing devices is separated from each of the first and second clusters of local computing devices by at least one street. The method may include providing a second local wireless device associated with the second cluster of local computing devices and a third local wireless device associated with the first cluster of local computing devices, and forming the at least one point-to-point wireless communication link may include providing wireless communication between the second and third local wireless devices.

Another embodiment is directed to a hybrid fiber/wireless network. The network includes a first cluster of individual data plan subscribers interconnected with a first fiber communication network, a second cluster of individual data plan subscribers interconnected with a second fiber communication network, a backhaul wireless communication device coupled to the first fiber communication network, a backhaul network point in wireless communication with the backhaul wireless communication device, and a point-to-point wireless communication link formed between the first and second fiber communication networks.

In one example, the network may also include a first wireless transmission point connected to the first fiber communication network, and a second wireless transmission point connected to the second fiber communication network, wherein the first and second wireless transmission points define the point-to-point wireless communication link. The first and second wireless transmission points may be coupled to respective first and second fiber communication networks via separate first and second fiber switch points. The first and second fiber communication networks may be separated by at least one paved road. The backhaul wireless communication device may be arranged in line-of-site with the backhaul network point. At least the first fiber communication network may be bound on all sides by a paved road. Each individual data plan subscriber may be associated with a home, and the first fiber communication network may be buried between the homes. The first and second wireless transmission points may be mounted to homes.

A further embodiment relates to a combination fiber/wireless network that includes a plurality of clusters of individual data plan subscribers, each cluster forming a separate fiber network that is bound by a road. Each fiber network is connected to at least one other fiber network with at least one point-to-point wireless communication link. The network also includes at least one wireless backhaul device coupled to at least one of the plurality of clusters, and at least one backhaul network point in wireless communication with the at least one wireless backhaul device.

In one example, each cluster may be connected to at least two other clusters with separate point-to-point wireless communication links. Each cluster may be connected either directly to the at least one wireless backhaul device or via the at least one point-to-point wireless communication link. Each fiber network may be coupled to the at least one backhaul network point through separate wireless backhaul devices. Each data plan subscriber may be associated with a single building.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate generally to data transmission networks, such as wireless and fiber networks. One aspect of the disclosure relates to using wireless communication technology for portions of a fiber network. The systems and methods disclosed herein may be described as fiber/wireless networks, hybrid fiber networks, or hybrid wireless networks.

One aspect of the present disclosure relates to a fiber network that utilizes wireless data transmission to span roads. For example, a cluster of homes that comprises a plurality of individual data plan subscribers may be located within a neighborhood and bound by one or more roads. The subscribers within the cluster of homes may be connected to each other as a fiber network. One of the homes or a separate transmission point/structure may include a local wireless backhaul communication device (e.g., local backhaul device). The local backhaul device may be connected to a backhaul network point (e.g., a cell tower or base station) via a wireless connection. The wireless connection may extend for miles (e.g., long range across a plurality of roads). Typically, the wireless backhaul connection is made via a line-of-sight arrangement between the backhaul network point and the local backhaul device.

A second cluster of homes, which is physically separated from the first cluster of homes (e.g., separated by one or more roads or barriers) may be connected to the first cluster of homes with a short range, point-to-point wireless connection. The second cluster of homes may have its own local wireless backhaul communication device that is in separate wireless communication with one of a plurality of backhaul network points to provide redundancy.

In another example, several clusters of homes, which each include a plurality of individual data plan subscribers coupled by a fiber communication link, are connected together as a mesh network. The mesh network includes at least one local wireless backhaul communication device as part of the mesh of the several clusters of homes. Each cluster of homes is coupled to at least one other cluster of homes with a short range, point-to-point wireless connection. The at least one local wireless backhaul communication device is in wireless communication with the backhaul network. The local wireless backhaul communication device may be a separate device from the short range, point-to-point wireless devices used to wirelessly communicate data between the clusters of homes. In some examples, the local wireless backhaul communication device is combined with a short range, point-to-point wireless device to provide a combination wireless communication device with short and long range wireless communication capability.

Typically, short range, point-to-point wireless devices are relatively low cost as compared to long range, backhaul wireless communication devices. The short range, point-to-point wireless devices disclosed herein may provide multi-gigabyte wireless data transmission over short distances (e.g., in the tens or hundreds of feet). The long range, backhaul wireless communication devices disclosed herein may provide multi-gigabyte wireless data transmission over long distances (e.g., 1 to 20 miles). In the example mesh networks disclosed herein, a single long range, backhaul wireless communication device may be allocated for every 5 to 20 clusters of homes/subscribers, wherein each cluster includes a fiber link between each of the homes/subscribers in that cluster, and each cluster is connected to one or more adjacent clusters with at least one short range, point-to-point wireless connection.

The clusters of homes may vary depending on the setting of, for example, suburban homes, urban homes, business parks, and other commercial settings. In a suburban home setting, the fiber may be buried across common space behind the homes, or along a sidewalk/street in front of the homes. At least one of the homes may be used as the wireless endpoint for wireless connection to the backhaul network or to an endpoint of an adjacent cluster of homes in a mesh network (e.g., provide wireless communication across a road). In an urban setting, the fiber may extend across rooftops within a city block, and a wireless endpoint may be located at any point that provides unobstructed (e.g., line-of-sight) wireless communication with an endpoint at one or more adjacent city blocks and/or the backhaul network point.

The significant capital cost required to employ, for example, horizontal drilling under a road, building, sidewalk, or the like, to connect fiber across such obstructions makes widespread implementation of fiber in existing neighborhoods cost-prohibitive. The use of short range, point-to-point wireless devices between clusters of homes and other buildings that are isolated from other clusters by a road or other obstruction, eliminates the need to employ other much higher cost methods to traverse the road/obstruction with fiber while still maintaining the benefits of fiber within each cluster. The mesh nature of the hybrid fiber/wireless network provides redundancy for improved reliability by connecting each cluster to adjacent clusters using a plurality of short range, point-to-point wireless connections, and connecting the mesh of clusters to the backhaul network through a plurality of wireless backhaul connections.

Figure 1:
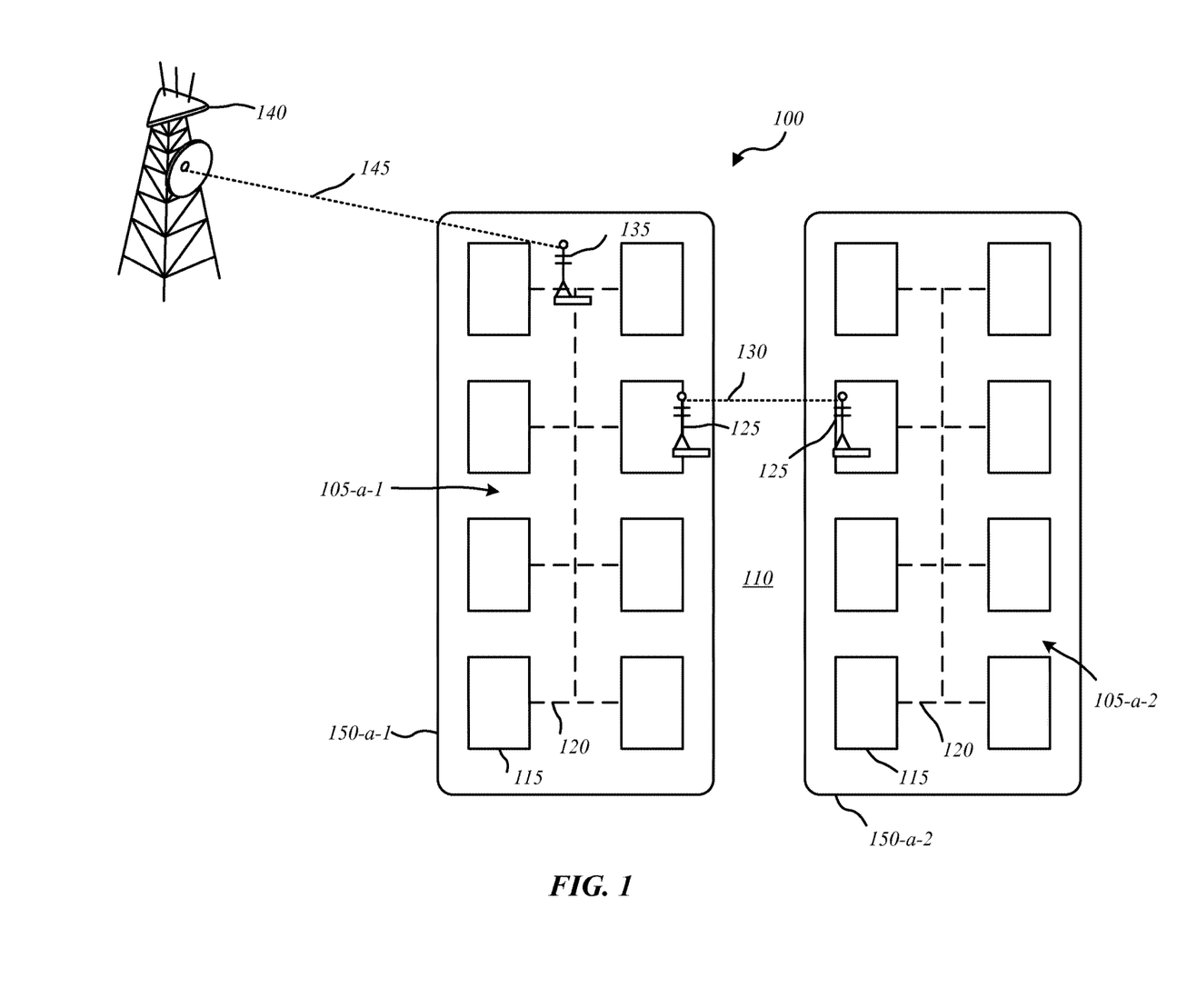
FIG. 1 is a block diagram of an environment in which the present systems and methods may be implemented.

FIG. 1 is a block diagram illustrating one embodiment of an environment 100 in which the present systems and methods may be implemented. In some embodiments, the systems and methods described herein are performed with a plurality of clusters of local end points 105, which may also be referred to as clusters of computing devices or clusters of individual plan subscribers. Each cluster of local end points 105 is separated from an adjacent cluster by a street 110 or other obstruction. Street 110 may also be referred to as a paved or cement surface such as an asphalt surface, a driveway, a sidewalk, a roadway, a parking lot, or the like. Each cluster 105 may be bound by and/or entirely encircled by one or more streets 110.

Each cluster of local end points 105 includes a plurality of local end points 115, which may also be referred to as computing devices or individual plan subscribers. At least some of the local end points 115 are connected with a fiber communication link 120, which may be referred to as a fiber network or a local fiber network. Clusters 105 may each include at least one point-to-point wireless device 125, which may be referred to as a short-range, point-to-point device, or a short-range wireless device. The point-to-point wireless devices 125 may provide a point-to-point wireless communication link 130. The point-to-point wireless devices 125 and corresponding point-to-point wireless communication links 130 may connect the fiber networks 120 of each cluster 105 to provide data transmission between the clusters 105.

One or more of the clusters 105 may also include a local backhaul wireless device 135 that is connected to the fiber network 120 of that particular cluster 105. The local backhaul wireless device 135 may also be referred to as a backhaul wireless communication device or a local backhaul device. Local backhaul wireless device 135 is wirelessly connected to a backhaul network point 140 with a backhaul wireless communication link 145. Backhaul network point 140 may also be referred to as a base station, cell tower, backhaul network, or the like.

As described above, the point-to-point wireless communication links 130 are typically short-range links in the range of, for example, 10 feet to 1,000 feet, and more particularly in the range of about 50 feet to about 200 feet. In contrast, the backhaul wireless communication link 145 may be a long-range wireless communication link in the range of, for example, 1,000 feet to 20 or 30 miles. Typically, backhaul wireless communication link 145 has a range of about 1 mile to about 10 miles for the hybrid fiber/wireless network shown in environment 100. There are usually fewer local backhaul wireless devices 135 than point-to-point wireless devices 125 used in the hybrid fiber/wireless network because of the substantial cost difference between short- and long-range wireless equipment. Although point-to-point wireless device 125 and local backhaul wireless device 135 may have comparable data transmission rates (e.g., in the multi-gigabyte range), the cost and complexity of long-range equipment for transmission of distances in the miles is significantly more than the type of equipment needed to wirelessly transmit data over short distances (tens or hundreds of feet).

Many types of technologies are available for use as the point-to-point wireless device 125 including, for example, Wi-Fi, Wigig, and Free Space Optics. Some example technologies for local backhaul wireless device 135 include Microwave/Millimeter Wave Backhaul Radio Products made by such companies as Siklu of Petach Tikva, Israel, Eband Communications, LLC of San Diego, Calif., and DragonWave of Ottawa, Ontario Canada.

Data transmission typically is maximized for the point-to-point wireless communication link 130 and the backhaul wireless communication link 145 when there is an unobstructed line-of-sight between the send and receive devices (e.g., between local backhaul wireless device 135 and backhaul network point 140, or between two point-to-point wireless devices 125). In many arrangements, the point-to-point wireless device 125 and local backhaul wireless device 135 are elevated vertically in order to reduce the possibility of obstructing the line-of-sight with a corresponding wireless device. In an example where the cluster of local end points 105 is a neighborhood or block 150, each local end point 115 is associated with a house, apartment building, condominium building, or the like. The point-to-point wireless device 125 and/or local backhaul wireless device 135 may be mounted to, for example, a rooftop of one of the buildings (e.g., house, garage, commercial building, etc.) for one of the local end points 115. Alternatively, a separate tower may be mounted to another structure or directly to a ground support surface in order to elevate the point-to-point wireless device 125 and/or local backhaul wireless device 135 to provide the desired unobstructed, line-of-sight positioning relative to a corresponding wireless transmission device. Backhaul network point 140 is typically a tower, base station, or the like, and may be mounted to a building or supported directly on a ground support surface. In some examples, backhaul network point 140 is positioned on an elevated point of terrain such as a hill or mountaintop. In another example, backhaul network point 140 is mounted to the top of a skyscraper or other relatively tall building compared to surrounding buildings. Backhaul network point 140 may be connected to a backhaul network such as a central fiber exchange or carrier hotel that may be separated from the clusters 105 by a significant distance.

Each cluster of local end points 105 includes at least two different local end points 115. Each local end point 115 may be associated with an individual plan subscriber or an individual computing device. Alternatively, a plurality of local end points 115 may be associated with a single building, such as a condominium building that has a plurality of separate living spaces, wherein each living space is associated with an individual plan subscriber. Each local end point 115 is connected to the other local end points of the cluster 105 with the fiber communication link 120. Accordingly, the fiber network 120 provides the benefits of fiber data transmission within a given cluster 105.

The point-to-point wireless communication links 130 may eliminate the need to employ expensive trenching, boring, or other methods that may otherwise be required to create a wired connection across street 110 or other obstruction that separates clusters 105. The cost of equipment for the point-to-point wireless devices 125 may be relatively insignificant as compared to fiber installation costs, particularly fiber installation costs involved in traversing street 110 or other obstruction that separates clusters 105. As such, a plurality of point-to-point wireless communication links 130 may be formed between any given cluster 105 and surrounding clusters. In one example, as will be described in further detail below, each cluster 105 has a point-to-point wireless communication link 130 provided by point-to-point wireless devices 125 with each adjacent cluster 105, thereby providing a mesh network of fiber and wireless data communication links.

Figure 2:
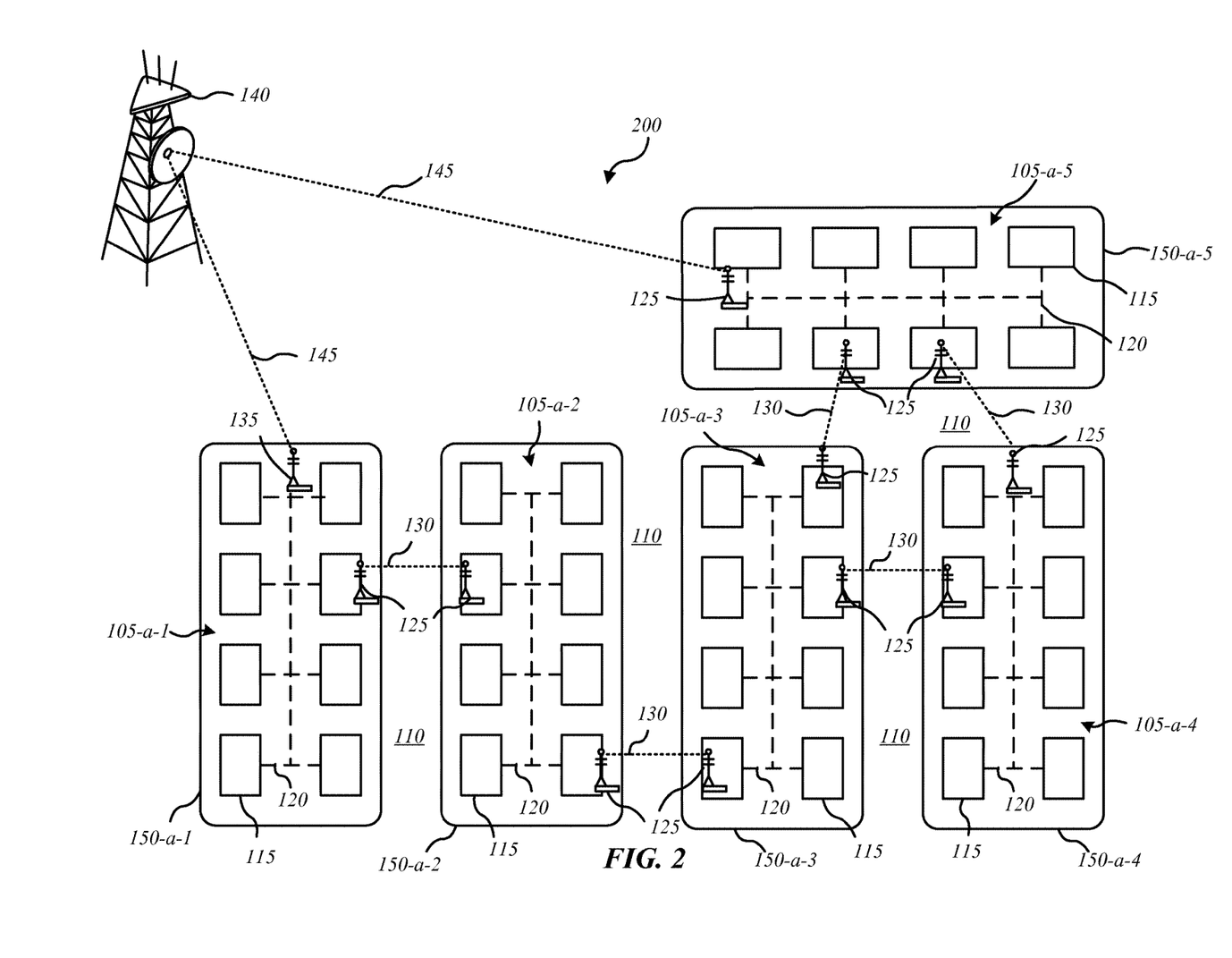
FIG. 2 is a block diagram of another environment in which the present systems and methods may be implemented.

FIG. 2 shows an environment 200 that may include the components of environment 100 described above, and may further include additional clusters of local end points 105 and a plurality of backhaul wireless communication links 145. At least some of the clusters of local end points 105, which each include a fiber network 120, are coupled to adjacent clusters 105 with a plurality of point-to-point wireless communication links 130. For example, cluster 105-*a*-2 has separate point-to-point wireless communication links 130 with each of clusters 105-*a*-1 and 105-*a*-3. Another example includes connecting cluster 105-*a*-3 with each adjacent cluster 105-*a*-2, 105-*a*-4 and 105-*a*-5 with separate point-to-point wireless communication links 130. In at least some examples, each cluster 105 has at least one point-to-point wireless communication link 130 with each directly adjacent cluster 105. In other examples, each cluster 105 may have a plurality of point-to-point wireless communication links 130 with one or more adjacent clusters 105. As described above, each cluster 105 is separated from an adjacent cluster by street 110. Each cluster 105 may be bound by or completely surrounded by street 110, a paved surface, or other obstruction which would require significant costs to traverse with fiber to connect separate fiber networks 120 of each cluster 105.

Environment 200 includes at least two separate backhaul wireless communication links 145. Each of the backhaul wireless communication links 145 is shown connected to a single backhaul network point 140. In the event one of the backhaul wireless communication links 145 goes down via, for example, rain fade associated with a significant downpour of rain, the other backhaul wireless communication link 145 would continue to provide data transmission to the mesh network formed between clusters 105. As mentioned above, each backhaul network point 140 and associated backhaul wireless communication link 145 may service a plurality of clusters 105 (e.g., 2 to 20 clusters 105). Similarly, two backhaul wireless communication links 145 may be provided for every 5 to 30 clusters 105, three backhaul wireless communication links 145 for every 20 to 60 clusters 105, etc. The number of required backhaul wireless communication links 145 may depend on a number of factors including, in addition to the number of clusters 105, the distance to backhaul network point 140, the maximum and minimum data transmission rates available for backhaul wireless communication links 145, the climate and/or expected weather conditions (e.g. significant rain or snow expected for a certain number of days per year), and the possibility of the line-of-sight being obstructed. The number of point-to-point wireless devices 125 and associated point-to-point wireless communication links 130 required for environment 200 may depend in part on, for example, the distance between the point-to-point wireless devices 125 (e.g., based on a width of street 110) and other factors similar to those discussed above related to the backhaul wireless communication links 145.

While it may be ideal for the point-to-point wireless devices 125 to have line-of-sight, and the local backhaul wireless device 135 and backhaul network point 140 to have line-of-sight, some technologies may provide relatively high data transmission rates without line-of-sight available such as sub 6 GHz microwave wireless from companies such as Tarana Wireless of Santa Clara, Calif.

Figure 3:
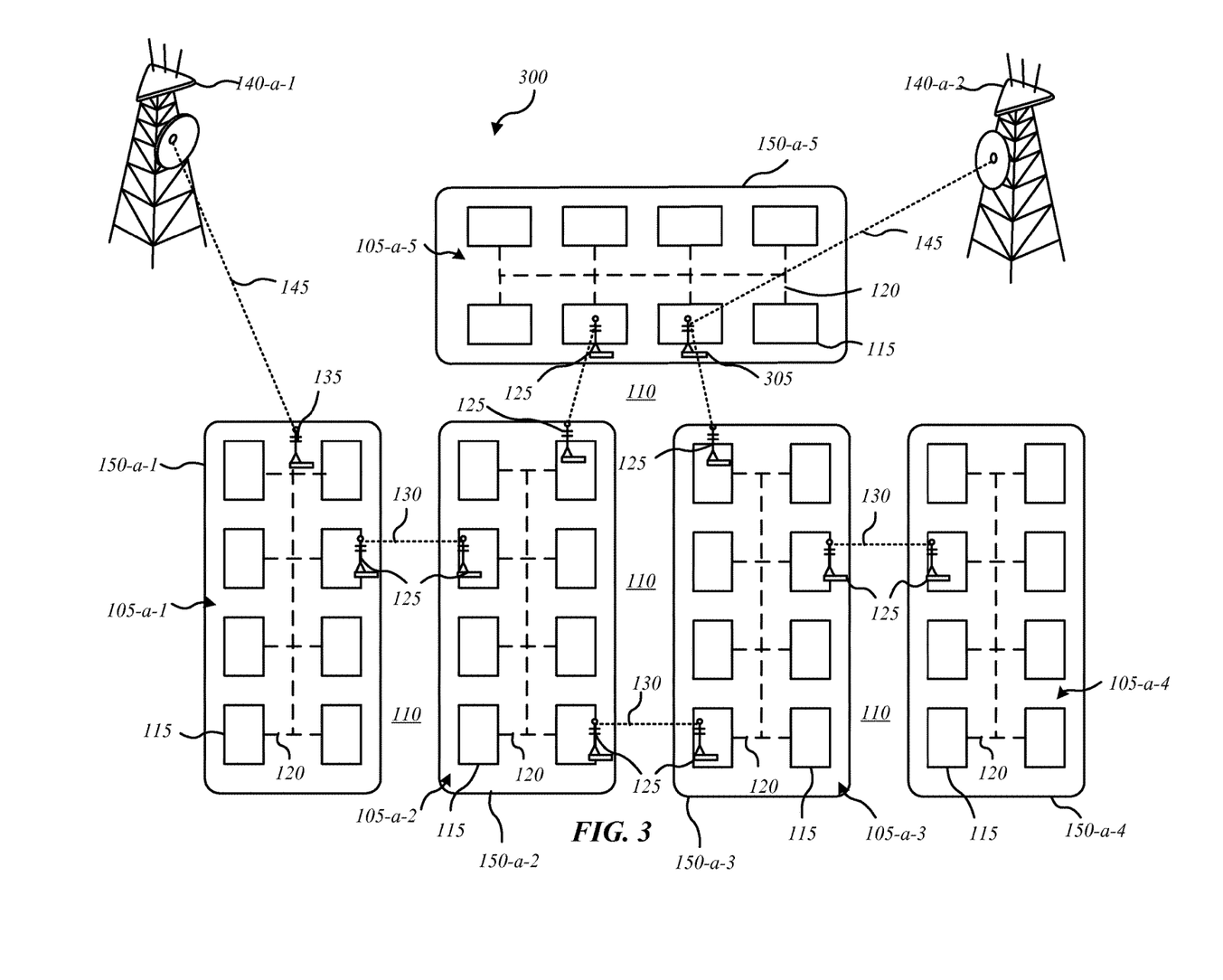
FIG. 3 is a block diagram of another environment in which the present systems and methods may be implemented.

Referring now to FIG. 3, in some embodiments an environment 300 may include the components of environments 100, 200 described above, and may further include two separate backhaul network points 140. Backhaul network point 140-*a*-1 is shown in wireless communication with a dedicated local backhaul wireless device 135 for cluster 105-*a*-1. Backhaul network point 140-*a*-2 is shown in wireless communication with a combination local backhaul/point-to-point wireless device 305. Device 305 may have the capability to provide both the backhaul wireless communication link 145 with backhaul network point 140-*a*-2 as well as a point-to-point wireless communication link 130 with one of the point-to-point wireless devices 125 of an adjacent cluster 105. Combining the backhaul and point-to-point communication capabilities into a single device 305 may provide advantages as compared to utilizing separate devices for backhaul and point-to-point communications (e.g., separate wireless devices 125 and 135). For example, if a tower or mounting structure is required to provide line-of-sight with backhaul network point 140-*a*-2 as well as a point-to-point wireless device within the mesh network, only a single such structure is required when using the combination device 305. Providing a single device may reduce costs for installation, maintenance, etc., as well as reduce the visual obstruction that may result from locating device 305 at an elevated position.

Providing separate backhaul network points 140 may improve the redundancy for environment 300 as compared to other environments that include only a single backhaul network point 140 (e.g., see environments 100, 200), even when multiple backhaul wireless communication links 145 are used with a single backhaul network point 140 (e.g., see environment 200). The backhaul network points 140 may be physically separated from each other so that a single event (e.g., rain or snow storm, wind storm, or other weather) does not identically affect both backhaul network points 140 and the resulting backhaul wireless communication links 145. The clusters 105 may be consolidated in a relatively small geographic area. The backhaul network points 140 may be separated from the clusters 105 a significant distance and in different directions relative to the clusters 105. Furthermore, the backhaul network points 140 may be spaced at different distances from the clusters 105 (e.g., one backhaul network point 140 positioned at five miles and the other backhaul network point 140 positioned at two miles). The variations possible when using two or more backhaul network points 140 may be optimized to provide improved performance and/or redundancy for data transmission related to environment 300. In other embodiments, three or more backhaul network points 140 may be used for a given mesh network. As discussed above, when addressing a large number of clusters (e.g., in the range of 50 to 500 clusters 105) a backhaul wireless connection communication links 145 may be recommended for a certain number of clusters 105 (e.g., one backhaul wireless communication link 145 for every 5, 10, 20, etc. clusters 105). A single backhaul network point 140 may communicate with a plurality of different local backhaul wireless devices 135 or combination devices 305 in a given mesh network. Alternatively, a separate backhaul network point 140 may be associated with and provide a backhaul wireless communication links 145 with each local backhaul wireless device 135, 305.

Figure 4:
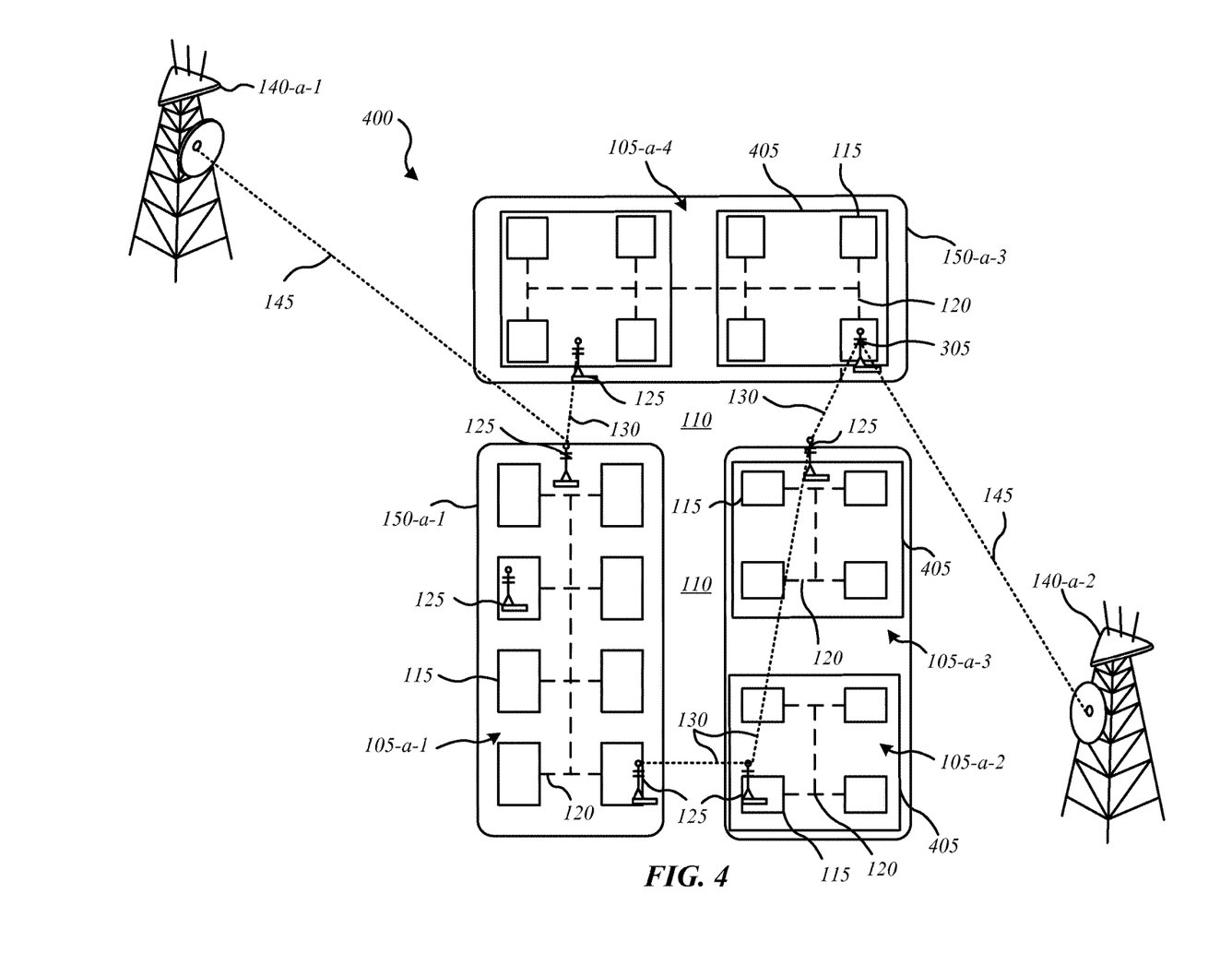
FIG. 4 is a block diagram of another environment in which the present systems and methods may be implemented.

FIG. 4 illustrates an environment 400 that may include the components of environments 100, 200, 300 described above, and may further include one or more buildings 405 having multiple local end points 115. A given neighborhood or block 150 may include a plurality of buildings 405, wherein each building includes a plurality of local end points 115.

Building 405 may represent, for example, an apartment building, high rise condominium, office building, strip mall, or the like.

In at least some examples, each building 405 is coupled to other buildings 405 in a given neighborhood/block 150 with a fiber network 120. In other examples, each building 405 may represent a given cluster 105 having its own fiber network 120. Point-to-point wireless devices 125 positioned on separate buildings 405 may be used to form a point-to-point wireless communication link 130 (see clusters 105-*a*-2 and 105-*a*-3 shown in FIG. 4). The cost and other factors associated with coupling the fiber networks 120 of each building 405 to each other within a given neighborhood or block 150 may make it advantageous to provide a point-to-point wireless communication link 130 between the buildings 405 of a given block 150 rather than providing a fiber connection between the fiber networks 120.

Figure 5:
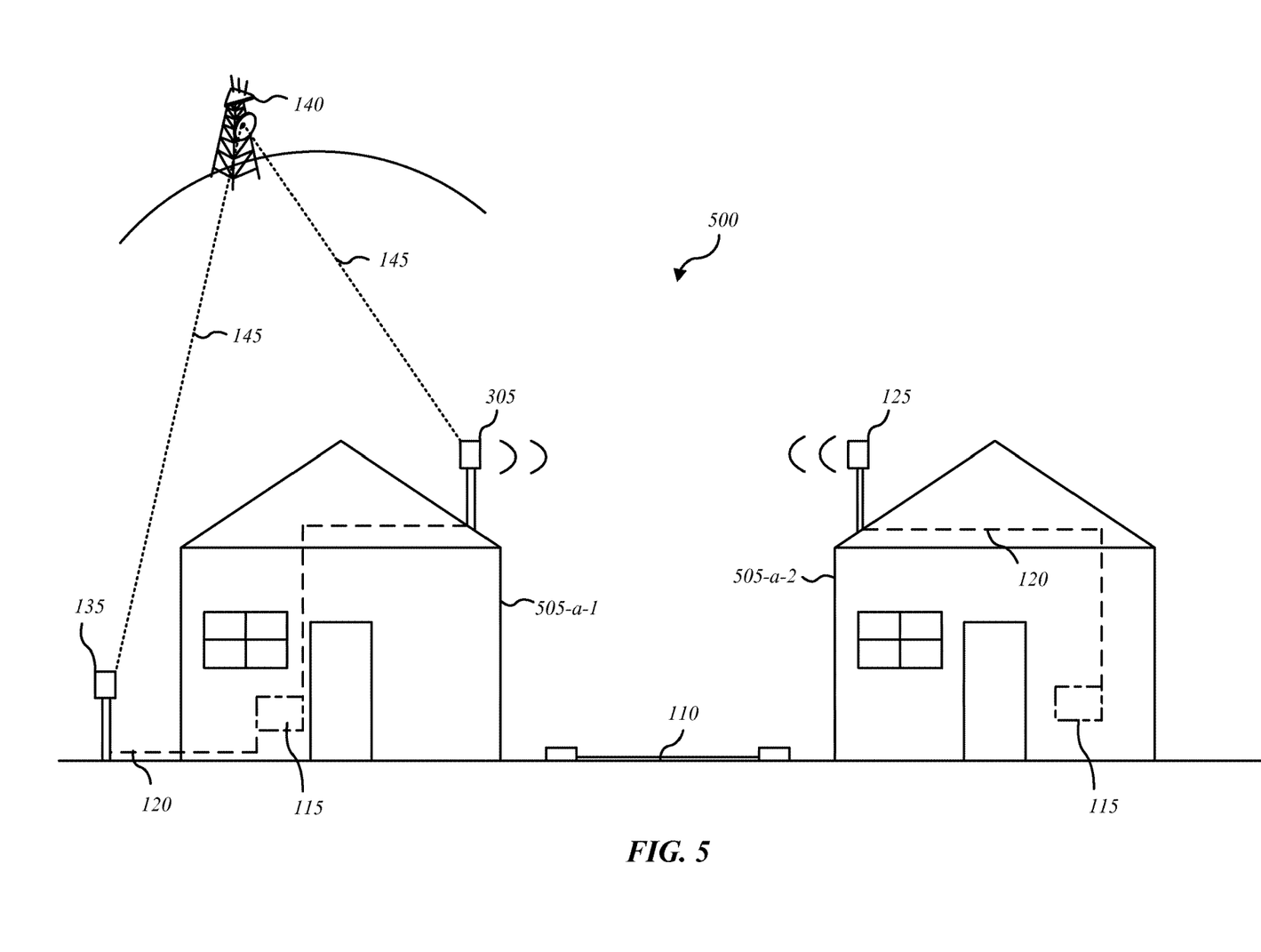
FIG. 5 is a block diagram of another environment in which the present systems and methods may be implemented.

Referring to FIG. 5, in some embodiments, an environment 500 may include at least some of the components of environments 100, 200, 300, 400 described above with reference to FIGS. 1-4, and may further include a pair of houses 505. The houses 505 may be one example of the local end points 115 shown in FIGS. 1-4, or may house or have positioned therein one or more local end points 115.

FIG. 5 shows house 505-*a*-1 including a combination device 305 mounted to a roof of house 505-*a*-1. Combination device 305 provides a backhaul wireless communication link 145 with backhaul network point 140, which is positioned remote from houses 505. Combination device 305 may also provide a point-to-point wireless communication link 130 with a point-to-point wireless device 125 mounted to house 505-*a*-2. Houses 505 may be separated by street 110 or other obstruction. Houses 505 may be associated with separate clusters 105, wherein each cluster is separated from adjacent clusters with a street 110 or other obstruction.

Combination device 305 is connected with a fiber connection to a local end point 115 (e.g., a computer system, Wi-Fi device, etc.). Local end points 115 may be connected to other local end points 115 within the cluster 105 associated with house 505. The local end points 115 of a given cluster 105 may be associated with separate houses 505 and be interconnected with fiber communication link 120 to form a fiber network 120 for that cluster.

In a variation of the environment 500 shown in FIG. 5, the combination device 305 is a point-to-point wireless device 125 and no backhaul wireless communication link 145 is provided between backhaul network point 140 and the point-to-point wireless device 125. However, backhaul network point 140 may be connected via backhaul wireless communication link 145 with a separate local backhaul wireless device 135 that is provided separate from house 505. Fiber network 120 is connected to local backhaul wireless device 135 to provide data transmission to local end point 115 using a hybrid fiber/wireless system. Further, house 505-*a*-1 may provide data transmission to a separate point-to-point wireless device 125 of house 505-*a*-2 to traverse street 110 with a point-to-point wireless communication link 130. Environment 500 may provide a fiber/wireless mesh network with the point-to-point wireless communication links 130 formed between houses of separate clusters that are separated by streets 110. In still further embodiments, a separate backhaul network point 140 may have a backhaul wireless communication link 145 with the cluster that house 505-*a*-2 is a part of to provide redundancy in the mesh network.

Figure 6:
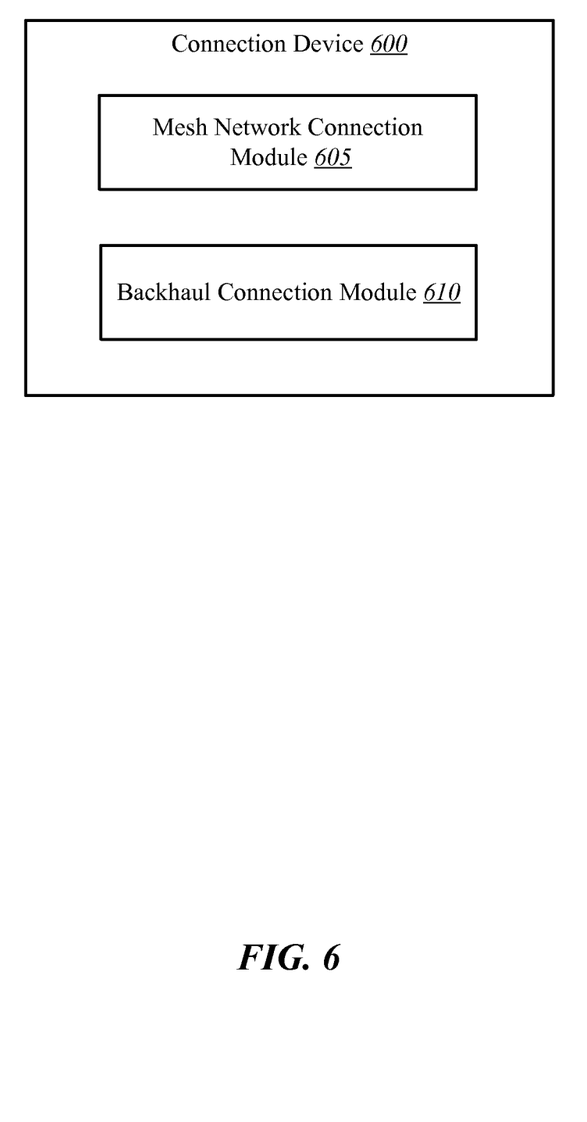
FIG. 6 is a block diagram of an example connection device in which the present systems and methods may be implemented.

FIG. 6 is a block diagram illustrating an example connection device 600. Connection device 600 may be one example of the point-to-point wireless device 125, local backhaul wireless device 135, and/or combination device 305 described above with reference to FIGS. 1-5. Connection device 600 may include a mesh network connection module 605 and a backhaul connection module 610. In other embodiments, connection device 600 includes only one or the other of mesh network connection module 605 and backhaul connection module 610. In some embodiments, connection device 600 includes only one or the other of mesh network connection module 605 and backhaul connection module 610.

Mesh network connection module 605 may operate to provide a point-to-point wireless communication link 130 between separate point-to-point wireless devices 125 of two separate clusters 105 of local end points 115. Mesh network connection module 605 may have the capability to send and/or receive data wirelessly via a point-to-point wireless communication medium. Typically, mesh network connection module 605 provides a relatively short range wireless communication link that is well suited for short distances such as, for example, crossing a street or spanning across an obstruction such as a body of water (e.g., river, lake, or viaduct), a building, a park, a tree, or a parking lot. Mesh network connection module 605 may also operate to provide connectivity to a fiber network such as fiber network 120 that interconnects the local end points 115 of a cluster 105.

Mesh network connection module 605 may be operable to determine a rate of data transmission between connection device 600 and another device such as a point-to-point wireless device 125. Mesh network connection module 605 may provide notices and/or status reports in response to predetermined thresholds related to the rate of data transmission. Mesh network connection module 605 may include software or operate using software and/or hardware that may be updated to provide improved data transmission rates for a hybrid fiber/wireless mesh.

Backhaul connection module 610 may operate to provide a backhaul wireless communication link with a backhaul network point. Backhaul connection module 610 may provide the capability of transmitting data wirelessly over significant distances such as, for example, distances of miles or tens of miles. Backhaul connection module 610 may continually assess a data transmission rate for the backhaul wireless communication link and generate notices when comparing such performance data against predetermined criteria. Backhaul connection module 610 may include software or operate using software and/or hardware that may be upgraded to provide improved data transmission speeds for the backhaul wireless communication link 145.

As described above related to at least environments 300, 400, 500, connection device 600 may facilitate both point-to-point wireless communication links and backhaul wireless communication links with a single device. Connection device 600 may include the capability of both short-range and long-range wireless data communication in the multi-gigabyte range.

Figure 7:
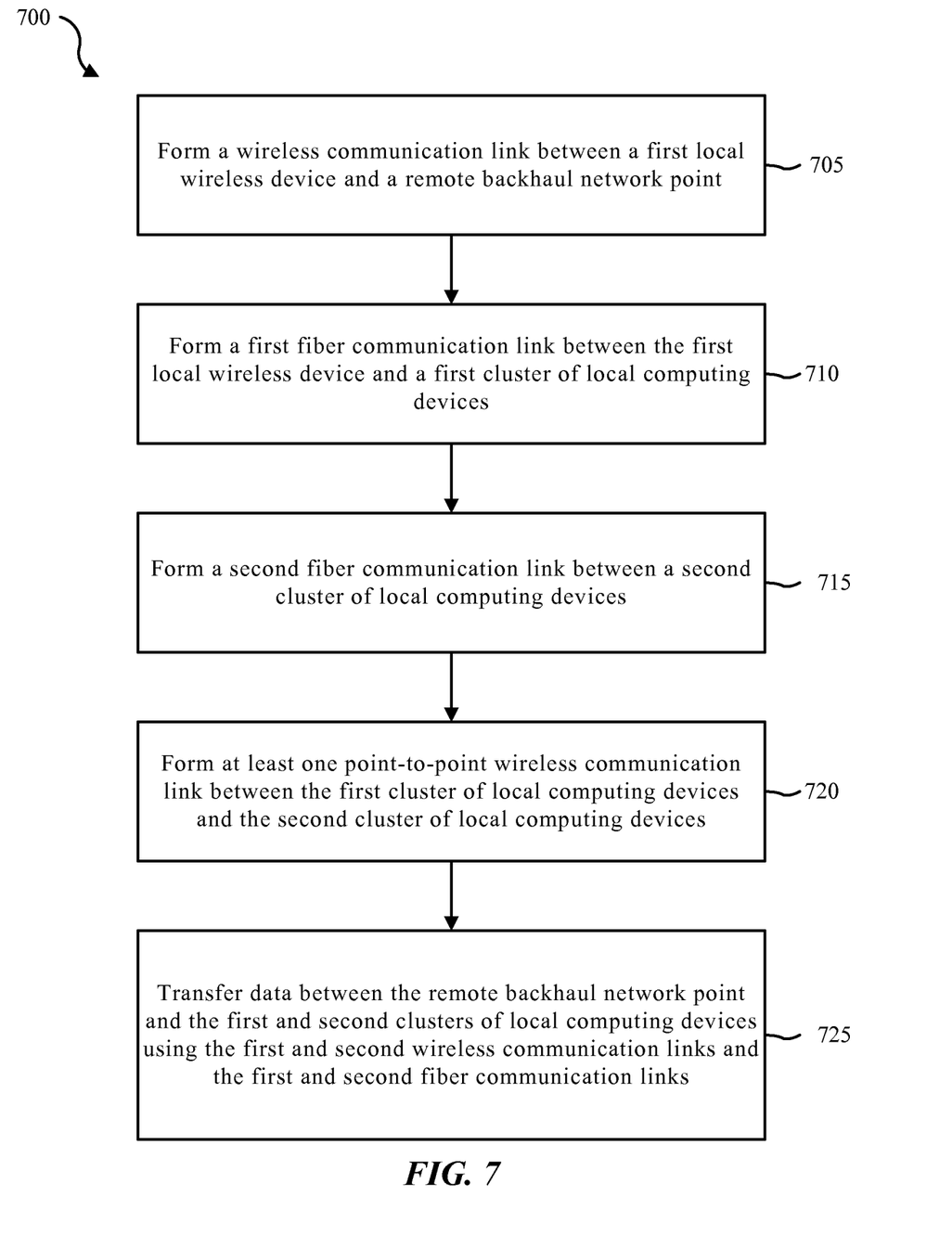
FIG. 7 is a flow diagram illustrating a method for transmitting data using fiber and wireless communication systems.

FIG. 7 is a flow diagram illustrating one example of a method 700 for transmitting data using fiber and wireless communication systems. In some configurations, the method 700 may be implemented by the point-to-point wireless devices 125, local backhaul wireless devices 135, backhaul network points 140, combination devices 305, and connection device 600 described with reference to FIGS. 1-6, or more generally by the environments 100, 200, 300, 400, 500 shown in FIGS. 1-5.

At block 705, method 700 includes forming a wireless communication link between a first local wireless device and a remote backhaul network point. Block 710 includes forming a first fiber communication link between the first local wireless device and a first cluster of local computing devices. At block 715, method 700 includes forming a second fiber communication link between a second cluster of local computing devices. Block 720 includes forming at least one point-to-point wireless communication link between the first cluster of local computing devices and the second cluster of local computing devices. Block 725 includes transferring data between the remote backhaul network and the first and second clusters of local computing devices using the first and second wireless communication links and the first and second fiber communication links.

The first and second clusters of local computing devices may be separated by a paved road. Each of the local computing devices may be located at a separate house. The method 700 may include providing a second local wireless device associated with the second cluster of local computing devices, and forming the at least one point-to-point wireless communication link includes wireless communication between the first and second local wireless devices. The remote backhaul network point may include a base station. The method 700 may include forming a third fiber communication link between a third cluster of local computing devices, forming at least one point-to-point wireless communication link between one of the first and second clusters of local computing devices and the third cluster of local computing devices, wherein the third cluster of local computing devices is separated from each of the first and second clusters of local computing devices by at least one street. The method 700 may include providing a second local wireless device associated with the second cluster of local computing devices, and a third local wireless device associated with the first cluster of local computing devices, and forming the at least one point-to-point wireless communication link includes wireless communication between the second and third local wireless devices.

Figure 8:
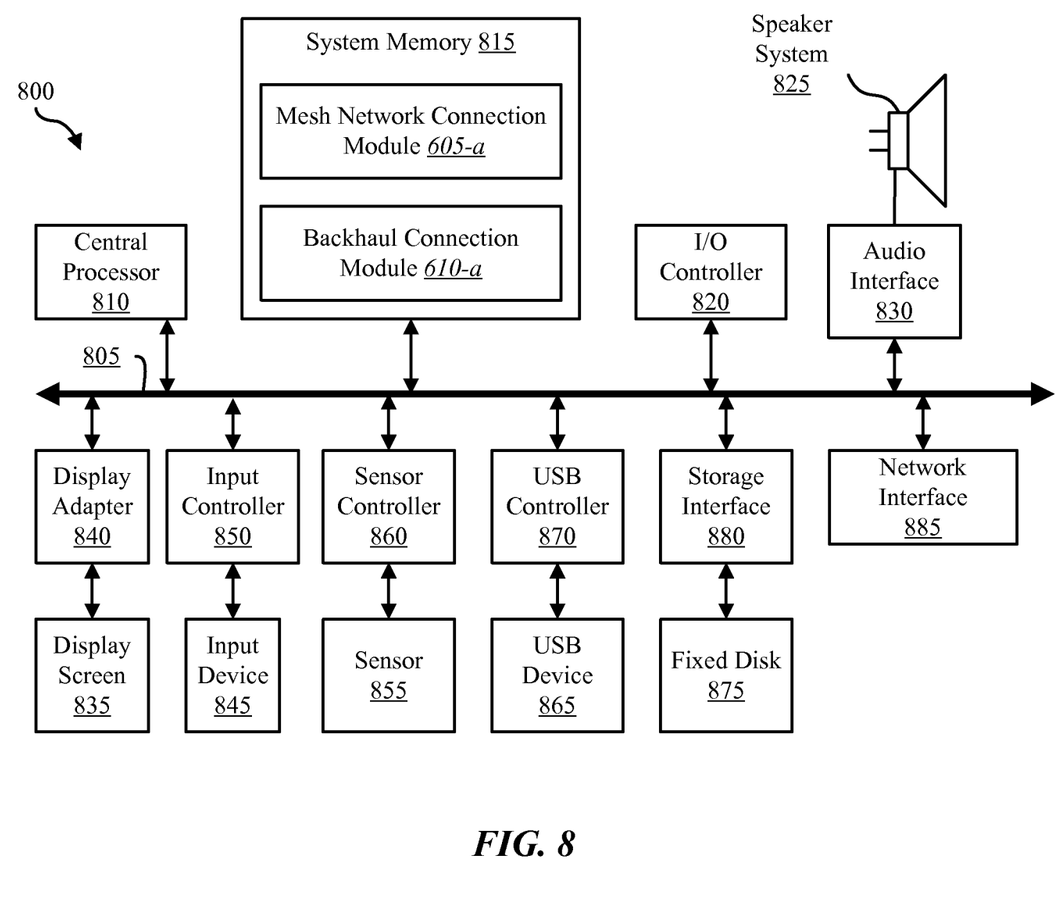
FIG. 8 is a block diagram of a computer system suitable for implementing the present systems and methods of FIGS. 1-7.

FIG. 8 depicts a block diagram of a controller 800 suitable for implementing the present systems and methods. In one configuration, controller 800 includes a bus 805 which interconnects major subsystems of controller 800, such as a central processor 810, a system memory 815 (typically RAM, but which may also include ROM, flash RAM, or the like), an input/output controller 820, an external audio device, such as a speaker system 825 via an audio output interface 830, an external device, such as a display screen 835 via display adapter 840, an input device 845 (e.g., remote control device interfaced with an input controller 850), multiple USB devices 865 (interfaced with a USB controller 870), and a storage interface 880. Also included are at least one sensor 855 connected to bus 805 through a sensor controller 860 and a network interface 885 (coupled directly to bus 805).

Bus 805 allows data communication between central processor 810 and system memory 815, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the mesh network connection module 605-a and backhaul connection module 610-a used to implement the present systems and methods may be stored within the system memory 815. Applications resident with controller 800 are generally stored on and accessed via a non-transitory computer readable medium, such as a hard disk drive (e.g., fixed disk 875) or other storage medium. Additionally, applications can be in the form of electronic signals modulated in accordance with the application and data communication technology when accessed via network interface 885.

Storage interface 880, as with the other storage interfaces of controller 800, can connect to a standard computer readable medium for storage and/or retrieval of information, such as a fixed disk drive 875. Fixed disk drive 875 may be a part of controller 800 or may be separate and accessed through other interface systems. Network interface 885 may provide a direct connection to a remote server via a direct network link to the Internet via a POP (point of presence). Network interface 885 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 800 wirelessly via network interface 885.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 8 need not be present to practice the present systems and methods. The devices and subsystems can be interconnected in different ways from that shown in FIG. 8. The aspect of some operations of a system such as that shown in FIG. 8 are readily known in the art and are not discussed in detail in this application. Code to implement the present disclosure can be stored in a non-transitory computer-readable medium such as one or more of system memory 815 or fixed disk 875. The operating system provided on controller 800 may be iOS® ANDROID®, MS-DOS®, MS-WINDOWS®, OS/2® UNIX®, LINUX® or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for transmitting data using fiber and wireless communication systems, comprising:
    placing a first remote backhaul network point and a second redundant remote backhaul network point at different distances and in different directions from a first cluster of local computing devices and a second cluster of local computing devices;
    forming a first wireless communication link of at least two wireless communication links between a first local wireless device and the first remote backhaul network point of at least two physically separated remote backhaul network points;
    forming a second wireless communication link of the at least two wireless communication links between at least one of the first local wireless device or a second local wireless device and the second redundant remote backhaul network point of the at least two physically separated remote backhaul network points, wherein a quantity of the at least two wireless communication links is based at least in part on a transmission rate associated with at least one of the at least two wireless communication links and a distance from at least one of the at least two physically separated remote backhaul network points to the first local wireless device or the second local wireless device;
    forming a first fiber communication link between the first local wireless device and the first cluster of local computing devices;
    forming a second fiber communication link between the second cluster of local computing devices;
    forming at least one point-to-point wireless communication link between the first cluster of local computing devices and the second cluster of local computing devices via a point-to-point wireless communication link between the first local wireless device and the second local wireless device associated with the second cluster of local computing devices, wherein the first cluster of local computing devices and the second cluster of local computing devices are separated by a single street, and forming the at least one point-to-point wireless communication link over the single street, wherein the first local wireless device or the second local wireless device comprises a single combination device that forms the at least one point-to-point wireless communication link, the first fiber communication link, and the first wireless communication link;
    transferring data between the first remote backhaul network point and the first cluster of local computing devices and the second cluster of local computing devices using the first fiber communication link and the second fiber communication link and the at least one point-to-point wireless communication link; and
    transferring data, based at least in part on the first wireless communication link being suboptimal, between the second redundant remote backhaul network point and the first cluster of local computing devices and the second cluster of local computing devices using the first fiber communication link and the second fiber communication link and the at least one point-to-point wireless communication link.

2. The method of claim 1, wherein each of the local computing devices is located at a separate house.

3. The method of claim 1, further comprising providing the second local wireless device associated with the second cluster of local computing devices, and forming the at least one point-to-point wireless communication link includes wireless communication between the first local wireless device and the second local wireless device.

4. The method of claim 1, wherein at least one of the first remote backhaul network point or the second redundant remote backhaul network point includes a base station.

5. The method of claim 1, further comprising:
    forming a third fiber communication link between a third cluster of local computing devices; and
    forming at least one point-to-point wireless communication link between one of the first cluster of local computing devices and the second cluster of local computing devices and the third cluster of local computing devices;
    wherein the third cluster of local computing devices is separated from each of the first cluster of local computing devices and the second cluster of local computing devices by at least one street.

6. The method of claim 1, further comprising providing the second local wireless device associated with the second cluster of local computing devices and a third local wireless device associated with the first cluster of local computing devices, and forming the at least one point-to-point wireless communication link includes providing wireless communication between the second local wireless device and the third local wireless device.

7. A hybrid fiber/wireless network, comprising:
a first cluster of at least two local computing devices interconnected with a first fiber communication network;
a second cluster of at least two local computing devices interconnected with a second fiber communication network, wherein the first fiber communication network and the second fiber communication network are separated by at least one physical obstruction;
a first stationary backhaul wireless communication point of at least two remote backhaul network points coupled to the first fiber communication network;
a second redundant stationary backhaul wireless communication point of the at least two remote backhaul network points physically separated from the first stationary backhaul wireless communication point and coupled to the first fiber communication network;
a local backhaul network device configured for wireless communication with the second redundant stationary backhaul wireless communication point based at least in part on wireless communication between the local backhaul network device and the first stationary backhaul wireless communication point being suboptimal, wherein the first stationary backhaul wireless communication point and the second redundant stationary backhaul wireless communication point are located at different distances and in different directions from the first fiber communication network, and wherein a quantity of wireless communication links associated with the at least two remote backhaul network points is based at least in part on a transmission rate associated with the wireless communication links and a distance from at least one of the at least two remote backhaul network points to the local backhaul network device;
a stationary wireless transmission point connected to the second fiber communication network; and
a point-to-point wireless communication link of a length between 10 and 1,000 feet formed between the first fiber communication network and the second fiber communication network over the at least one physical obstruction, and defined by the local backhaul network device configured for wireless communication with the second redundant stationary backhaul wireless communication point and the stationary wireless transmission point, wherein the local backhaul network device comprises at least one combination device for forming the point-to-point wireless communication link, forming a fiber communication link with one of the at least two local computing devices within the first cluster, and wireless communication with at least one of the first stationary backhaul wireless communication point and the second redundant stationary backhaul wireless communication point.

8. The hybrid fiber/wireless network of claim 7, wherein the local backhaul network device and the stationary wireless transmission point are mounted to homes.

9. The hybrid fiber/wireless network of claim 7, wherein the local backhaul network device and the stationary wireless transmission point are coupled to the first fiber communication network and the second fiber communication network via separate first and second fiber switch points, respectively.

10. The hybrid fiber/wireless network of claim 7, wherein the at least one physical obstruction comprises at least one street.

11. The hybrid fiber/wireless network of claim 7, wherein the first stationary backhaul wireless communication point and the second redundant stationary backhaul wireless communication point are arranged in line-of-sight with the local backhaul network device.

12. The hybrid fiber/wireless network of claim 7, wherein at least the first fiber communication network is bound on all sides by a paved road.

13. The hybrid fiber/wireless network of claim 7, wherein each individual data plan subscriber is associated with a home, and the first fiber communication network is buried between the homes.

14. The hybrid fiber/wireless network of claim 7, wherein the length of the point-to-point wireless communication link is between 50 feet and 200 feet.

15. A fiber/wireless network, comprising:
a plurality of clusters of individual data plan subscribers, each cluster comprising at least two stationary local computing devices and forming a separate fiber network, each fiber network being separated from wired connection with at least one other neighboring fiber network by at least one physical obstruction and being wirelessly connected to the at least one other neighboring fiber network with at least one point-to-point wireless communication link over the at least one physical obstruction separating each fiber network from wired connection with the at least one other neighboring fiber network;
at least two physically separated redundant wireless stationary backhaul points each coupled to at least one of the plurality of clusters; and
at least one stationary local backhaul network device configured for separate wireless communication with the at least two physically separated redundant wireless stationary backhaul points through at least two backhaul communication links, wherein a quantity of the at least two backhaul communication links is based at least in part on a transmission rate associated with the at least two backhaul communication links and a distance from at least one of the at least two physically separated redundant wireless stationary backhaul points to the at least one stationary local backhaul network device, and wherein the at least two backhaul communication links are each longer than the at least one point-to-point wireless communication link, so that wireless communication through a second backhaul communication link of the at least two backhaul communication links is utilized when wireless communication through a first backhaul communication link of the at least two backhaul communication links is suboptimal, wherein the at least two physically separated redundant wireless stationary backhaul points are at different distances and in different directions from the coupled at least one of the plurality of clusters, and wherein the at least one stationary local backhaul network device comprises at least combination device associated with forming the at least one point-to-point wireless communication link, forming a fiber communication link with at least one of the at least two stationary local computing devices, and for wireless communication with the at least two physically separated redundant wireless stationary backhaul points.

16. The fiber/wireless network of claim 15, wherein each cluster is connected to at least two other clusters with separate point-to-point wireless communication links.

17. The fiber/wireless network of claim 15, wherein each cluster is connected either directly to the at least two physically separated wireless backhaul points or via the at least one point-to-point wireless communication link.

18. The fiber/wireless network of claim 15, wherein each fiber network is coupled to the at least one stationary local backhaul network device through separate wireless backhaul points.

19. The fiber/wireless network of claim 15, wherein each data plan subscriber is associated with a single building.

* * * * *